March 24, 1953 R. F. HURLEY 2,632,620
BRACKET FOR HANGING FIXTURES
Filed July 12, 1949
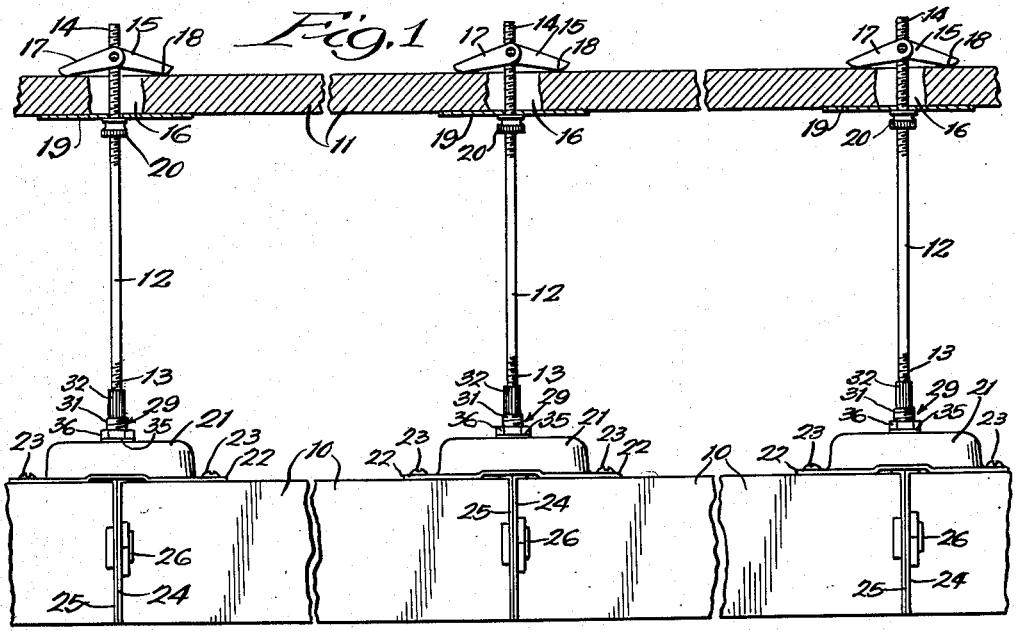
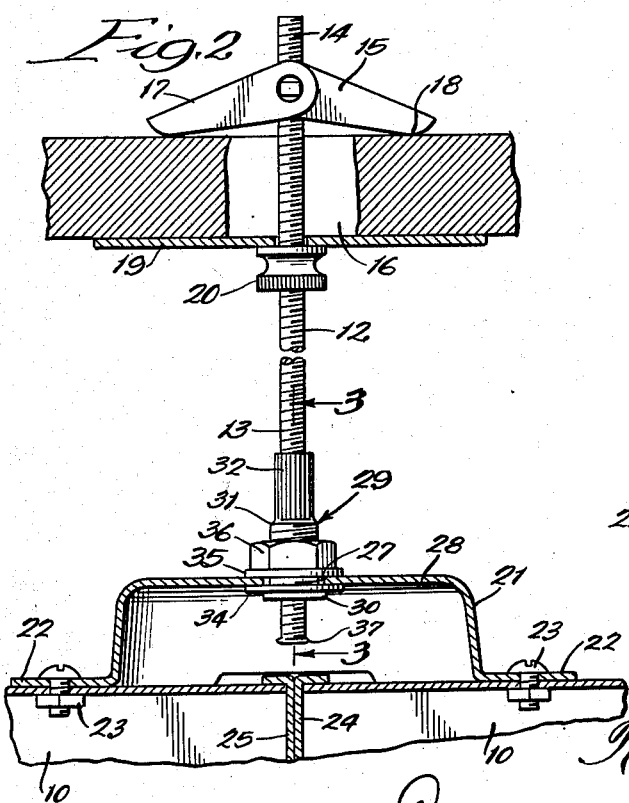
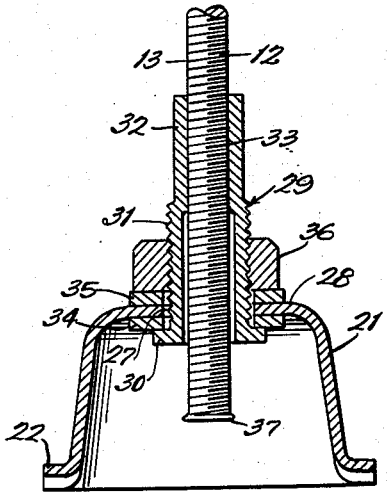
INVENTOR.
Raymond F. Hurley
BY Dawson, Ooms, Booth and Spangenberg
ATTORNEYS.

Patented Mar. 24, 1953

2,632,620

UNITED STATES PATENT OFFICE 2,632,620

BRACKET FOR HANGING FIXTURES

Raymond F. Hurley, Chicago, Ill., assignor to Curtis Lighting, Inc., Chicago, Ill., a corporation of Illinois Application July 12, 1949, Serial No. 104,365

2 Claims. (Cl. 248—343)

This invention relates to a suspension bracket, and more particularly to an adjustable bracket by which luminaires, lighting fixtures, and other hangings or fixtures are suspended from above.

As with lighting fixtures, it has been the practice to determine the desired spaced relation between the fixture and the ceiling and to measure that amount on the suspension rod for assembling the parts together in lieu of the hanging operations. Frequently, it is necessary to effect some adjustment in the height of such fixtures after they have been hung to correct for inadvertent errors or to compensate for non-uniformity between fixtures caused by ceiling structure or settling after the parts have been assembled. Adjustment of this type has, in the past, necessitated removal of substantial parts of the fixture in order to gain access to those elements by which adjustment for height might be effected. This procedure has made adjustment of fixtures after they have been assembled a laborious and time-consuming process.

It is an object of this invention to provide a new and improved suspension bracket for hanging fixtures by which adjustment for height can be made in a simple and easy manner without necessitating the disassembly of the fixture parts, and it is a related object to provide in such bracket means for providing a sturdy and permanent suspension when in the adjusted position.

Another object is to provide a suspension bracket with which adjustment for height can be made from without the fixture, notwithstanding the position thereof on the hanging stem.

These and other objects and advantages of this invention will hereinafter appear, and for purposes of illustration, but not of limitation, an embodiment is shown in the accompnying drawing in which Figure 1 is a fragmentary view, partially in section, of a number of hanger devices embodying features of this invention for carrying multiple units of lighting fixtures; Fig. 2 is an enlarged sectional view of one of the devices shown in Fig. 1; and Fig. 3 is an enlarged sectional view taken along the line 3—3 of Fig. 2.

Hanger or suspension devices embodying features of this invention are shown in the drawing for carrying multiple connected units of lighting fixtures 10 arranged in end-to-end relation. The devices shown might also be used to suspend a single lighting unit of luminaire, or any other fixture to be hung from the under side of a horizontally disposed wall 11.

The lighting fixture includes a hanger rod or stem 12 which may be threaded throughout its length or merely threaded in the end portions 13 and 14 respectively for reaction with elements that will hereinafter be described. The upper end portion 14 is provided with a spreadable toggle 15 which is adapted to be inserted with the rod 12 through a prepared opening 16 in the ceiling or wall 11. The toggle is adjustable longitudinally on the rod through means on the toggle provided for threaded engagement with the rod. For passage of electrical wires or for other purposes, the hanger rod or stem may also be in the form of a tubular member.

The toggle arms 17 and 18 are spread by springs as the opening is clear and then a canopy 19 is urged against the opposite face of the wall 11 by a nut 20, thereby rigidly to mount the hanger rod 12 in the ceiling.

A holder in the form of an inverted cup 21 formed of metal, plastic, wood, or other rigid material is carried on the lower end 13 of the hanger rod 12 in a manner permitting vertical adjustment thereon in a simple and expeditious manner. Horizontally disposed flanges 22, integral with the lower peripheral edge of the inverted cup 21, are provided with openings for the insertion of screw or bolt members 23 by which the fixture or fixtures are fastened to the holder 21 to establish a mounted relation. When a series of fixtures are to be hung from a ceiling in end-to-end relation, as shown in Fig. 1, it is expedient to position the hanger rod in the region of their meeting ends in order that the holder 21 may straddle the adjacent units and be separately secured to each. Added rigidity may be secured by connecting the abutting end walls 24 and 25 of adjacent fixtures with a screw and nut arrangement 26, or by other suitable connecting means. Instead of the cup, the holder may constitute the upper wall of a retainer strip, channel member or even the upper wall of the fixture itself in which a suitable opening is provided.

To the present, description has been made to conventional means for mounting luminaires or lighting fixtures from the under side of a horizontally disposed wall or ceiling. In the event that adjustment for height is desired to compensate for settling unevenness in the ceiling, or miscalculations, it has been necessary to remove the fixture, or the greater portion thereof, to gain access to the lower portion of the hanger rod to effect proper adjustment.

In accordance with this invention, the holder 21 may be raised or lowered a substantial amount without requiring access to the hanger rod from within. For this purpose, an opening 27 is provided in the upper wall 28 of the cup member which is dimensioned to permit a sleeve or coupling 29 to pass endwise therethrough and to be freely turnable axially therein. The lower end of the sleeve is provided with an abutment which may be in the form of an annular outwardly extending flange 30 dimensioned to be greater than the opening 27 to prevent passage therethrough. A substantial portion of the outer wall of the sleeve adjacent the flange 30 is screw-threaded, as at 31, while the remainder 32 of the sleeve is knurled or otherwise contoured to provide for a better grip for manual adjustment or by a suitable tool, such as a wrench.

A substantial proportion of the lower portion 32 of the bore through the sleeve or coupling is of slightly greater diameter than the hanger rod 12, while the upper portion 33 of the bore is screw-threaded to establish threaded engagement with the hanger rod 12.

To effect an assembly, the adjustable sleeve 29 having a washer 34 resting on the flange 30 is inserted endwise through the opening 27 until the washer 34 abuts the lower face of the wall 28. Then another washer 35 is provided to engage the opposite face of the wall and a nut 36 is provided on the threaded portion 31 of the sleeve member. The hanger rod 12 is brought into threaded engagement with the bore portion 33 and then either the sleeve or the rod is turned to pass a desired amount of the threaded portion 13 of the rod through the bore to position the adjusting sleeve 29 on the rod. When in the desired assembled relation, the nut 36 is tightened upon the washer 35 to establish a gripping relation with the wall 28 disposed between the washers.

When it is desired to adjust the fixture vertically on the hanger rod 12, it is only necessary to loosen the nut 36 to permit free turning movement of the adjustable sleeve or coupling 29. Thus the coupling may be turned in one direction to adjust the holder 21 upwardly or it may be turned in the opposite direction to lower the holder 21 with respect to the hanger rod 12. Such turning movement may be effected upon engagement of the portion 32 without requiring access to any portion disposed within the holder 21. Re-tightening of the nut 36 functions to secure the parts in their adjusted relation.

Since that portion of the hanger rod 12 which is disposed within the coupling and within the holder 21 is substantially concealed, it is expedient to upset the end 37 of the rod 12 to prevent passage thereof through the threaded portion 33 of the bore. The unthreaded portion 32 of the bore is designed to permit passage of the upset end for a substantial distance through the coupling before engaging the threaded portion, thereby to provide a greater degree of possible adjustment. In the event that the end of the rod is upset in advance of pre-assembly, it may be necessary to insert the hanger rod with the sleeve or coupling already attached through the opening 27 in the holder 21 even before the canopy 19 and toggle 15 are positioned on the other end.

It will be understood that the adjustable bracket may be used at the other end of the hanger rod or stem or at both ends and that the member to be suspended may even be a ceiling or wall adjustably suspended from supporting structures.

It will be further understood that numerous changes may be made in the details of construction, arrangement, and operation without departing from the spirit of the invention, especially as defined in the following claims.

I claim:

1. A bracket for hanging a fixture from a suspended screw-threaded rod comprising a holder for the fixture having an opening in its upper wall in spaced relation with the fixture, a sleeve member insertable through and axially rotatable within the opening, the sleeve member having an abutment at its lower end incapable of passing through the opening, a screw-threaded portion adjacent the abutment and a screw-threaded portion in the sleeve dimensioned threadably to engage the hanger rod, and a nut threadably engaged on the threaded portion adjacent the abutment for tightening to grip the wall of the holder positioned between the abutment and the nut member.

2. A bracket as claimed in claim 1 in which the sleeve has a bore extending therethrough and the second screw-threaded portion is in the upper end portion of the bore and the remainder is of greater diameter to enable upsetting of the end of the hanger rod and passage therethrough to the threaded portion.

RAYMOND F. HURLEY.

REFERENCES CITED

The following references are of record in the file of this patent:

UNITED STATES PATENTS

| Number | Name | Date |
|---|---|---|
| 1,102,079 | Rizer | June 30, 1914 |
| 1,270,296 | Jeune | June 25, 1918 |
| 1,326,959 | Paine et al. | Jan. 6, 1920 |
| 1,368,239 | Cohn | Feb. 15, 1921 |
| 2,262,157 | Beals | Nov. 11, 1941 |
| 2,528,238 | McDaid | Oct. 31, 1950 |